Sept. 3, 1968   J. H. BENT   3,399,801

EXPANSIBLE PLUG FOR FLUID SYSTEMS

Filed Sept. 6, 1967

JOHN H. BENT
INVENTOR.

BY *Lyon & Lyon*

ATTORNEYS

United States Patent Office 3,399,801
Patented Sept. 3, 1968

3,399,801
EXPANSIBLE PLUG FOR FLUID SYSTEMS
John H. Bent, 2418 Fontezuela Drive,
Hacienda Heights, Calif. 91745
Filed Sept. 6, 1967, Ser. No. 665,813
4 Claims. (Cl. 220—24)

ABSTRACT OF THE DISCLOSURE

A metal plug has a first portion which expands within a drilled hole under applied axial force, and has a second portion relatively movable by such force into contact with the first portion of the plug to limit the degree of its radial expansion.

BACKGROUND OF THE INVENTION

This invention relates to expansible plugs which are used to close drilled holes in metal parts. Devices of this type may be classified as closures, expansible plug type. The metal body of a valve, hydraulic cylinder, pump, or other component of a hydraulic fluid system may have drilled holes therein which must be closed to prevent leakage of hydraulic fluid. The Lee Patent 2,821,323 shows one form of plug device which is in extensive use for such purpose. In the device of the Lee patent, there are two separate elements: the first is a hollow expansible shell, and the second is a tapered expander which slides axially within the shell. The device of the present invention is of one-piece construction instead of two separate pieces. It has sufficient radial expansion to accommodate wide tolerances on the size of the drilled hole. It is particularly well adapted for economical manufacture on a quantity production basis. It is easily handled by mechanical devices and can readily be hopper-fed. A very important advantage is that it forms a permanent seal because of metal deformation, and does not rely solely on a friction fit.

SUMMARY

Briefly stated, the invention concerns a one-piece expandable plug which forms a leakproof seal in a drilled hole in a metal part. The first portion of the plug is deformed and expanded within the drilled hole under an applied axial force, and a second portion of the plug is relatively movable into contact with the first portion of the plug, to limit the extent of its deformation.

DESCRIPTION OF THE PREFERRED EMBODIMENTS

Figure 1:
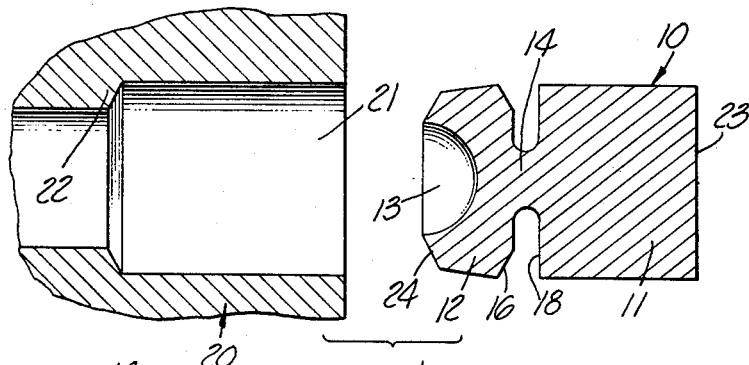
FIGURE 1 is a sectional elevation partly broken away, showing a drilled hole in a metal part, and showing an expansible plug embodying the present invention, prior to insertion into the drilled hole.

Referring to the drawings, a one-piece metal plug device generally designated 10 has an expansible head portion 12, with a cupped front end 13, and a neck 14 connecting the head portion 12 to the driving portion 11. The plug device 10 is formed to provide two contact surfaces 16 and 18, the surface 16 being formed on the head portion 12 and the surface 18 being formed on the driving portion 11.

Figure 2:
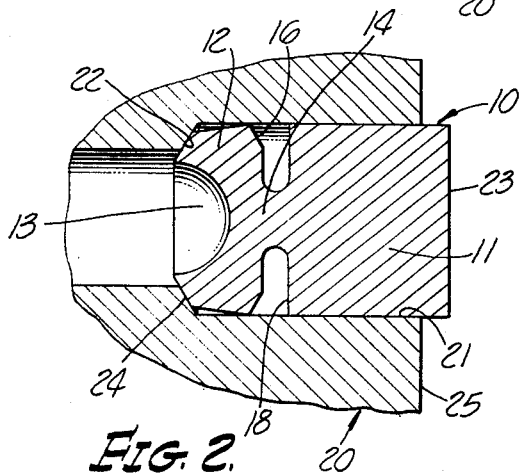
FIGURE 2 is a sectional view similar to FIGURE 1, showing the expansible plug positioned in the drilled hole but prior to the expansion step.
Figure 3:
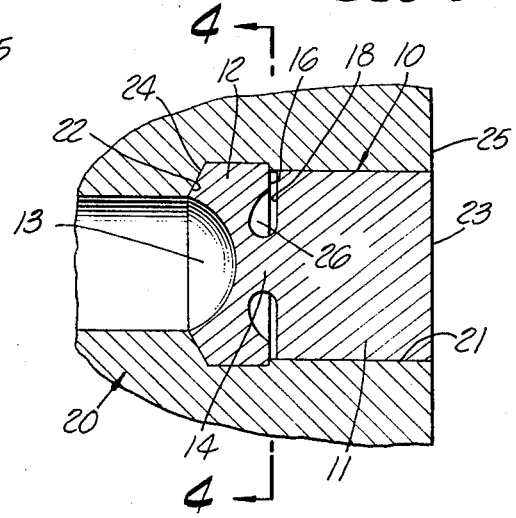
FIGURE 3 is a sectional view similar to FIGURE 2, showing the plug device in place after the expansion step is accomplished.
Figure 4:
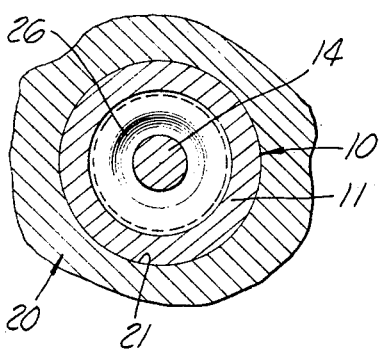
FIGURE 4 is a transverse sectional elevation taken substantially on lines 4—4 as shown in FIGURE 3.

A fluid component body shown generally as 20 has a drilled hole 21 and a shoulder 22. When it is desired to plug this hole 21, the plug device 10 is inserted axially into the hole to the position shown in FIGURE 2. An axial force is then applied to the exposed end 23 of the plug device 10, for example, by means of a hydraulic press, not shown. The axial force applied to the driving portion 11 is resisted by the annular shoulder 22 and causes the head portion 12 to deform and expand outwardly to the position shown in FIGURE 3. The neck 14 of the plug device compresses into the expanding head portion 12 to bring surfaces 16 and 18 together, thereby preventing further expansion of the head portion 12, and thus preventing excessive distortion of the fluid component body 20, which might lead to cracking. Engagement of the surfaces 16 and 18 thus serve to limit the extent of radial expansion of the head portion 12 of the plug device 10.

It will be observed that the position of the neck 14 and the location of the cupped front end 13 of the expansible head portion 12, in the initial unstressed condition shown in FIGURE 1, causes the head portion 12 to expand radially under axial pressure and to change from a generally cupped diaphragm shape to a straight diaphragm extending radially of the drilled hole 21. In its final expanded position, the head portion 12 is highly resistant to radial collapse.

The plug device 10 described above has sufficient radial expansion to accommodate considerable tolerance on the diameter of the drilled hole 21. The one-piece construction of the plug is attractive from the standpoint of low cost of manufacture, and the plug device can readily be made by a conventional screw machine. Moreover, the one-piece construction makes it easy to handle and permits hopper-feeding. Accidental disassembly after initial installation is highly unlikely, because the metal deformation is permanent and does not comprise merely a friction fit.

If desired, the outer surface 24 of the expansible head portion 12 may be slightly crowned or may be provided with circumferential score lines or grooves, these various expedients serving to further enhance the ability of the plug device to prevent leakage under high fluid pressures.

The axial length of the plug device 10 may be so proportioned with respect to the depth of the drilled hole 21 that driving of the portion 11 flush with the outer surface 25 provides the proper amount of expansion and also affords the best appearance of the completed assembly. Clearance 26 develops between the portions 12 and 11 of the plug device 10 brought about by spring-back of elastic deformation after the axial force on the exposed end of portion 11 is removed.

Having fully described my invention, it is to be understood that I am not to be limited to the details herein set forth but that my invention is of the full scope of the appended claims.

I claim:
1. A metal plug device for providing a fluid tight seal in a shouldered hole comprising: an expansible head portion and a driving portion connected by an integral neck, the head portion having one end adapted to contact the hole shoulder, having a central recess in said end, whereby upon application of axial force to the oposite end of said plug device to bring the expansible head portion into contact with the hole shoulder, the neck is driven into the head portion to cause it to expand radially to deform the wall of the drilled hole and thereby form a fluid tight seal.

2. A metal plug device as described in claim 1 in which the overall length thereof is longer than the depth of the drilled hole so that upon installation of the plug device into the drilled hole under applied axial force, the radial expansion of the head portion is achieved when the said other end of the plug device is flush with the outer end of the drilled hole.

3. A metal plug device for providing a fluid tight seal in a shouldered hole comprising: a head portion and a driving portion, said head portion and the driving portion being separated by a smaller neck portion, a first contact surface formed on said head portion adjacent said neck portion, a second contact surface on said driving portion adjacent said neck portion, said metal plug being adapted to be driven axially into the hole to engage said head portion with the hole shoulder and to expand the head portion of said plug to provide a seal with said member, said expansion being limited by the engagement of the said contact surfaces carried on the head portion and driving portions of said plug.

4. A metal plug device as described in claim 3, the head portion thereof being tapered away from the neck portion, said head portion having a cupped front end to aid in the outward expansion of said head portion when driven.

References Cited

UNITED STATES PATENTS

| | | | | |
|---|---|---|---|---|
| 2,097,173 | 10/1937 | Bazeley | | 220—24 |
| 3,264,992 | 8/1966 | Beck | | 220—24.5 |

JAMES B. MARBERT, *Primary Examiner.*